Feb. 5, 1957 F. T. ROBERTS 2,780,273
METHOD AND APPARATUS FOR MAKING A MOLDED FLEXIBLE HOSE
Filed Jan. 30, 1956 2 Sheets-Sheet 1
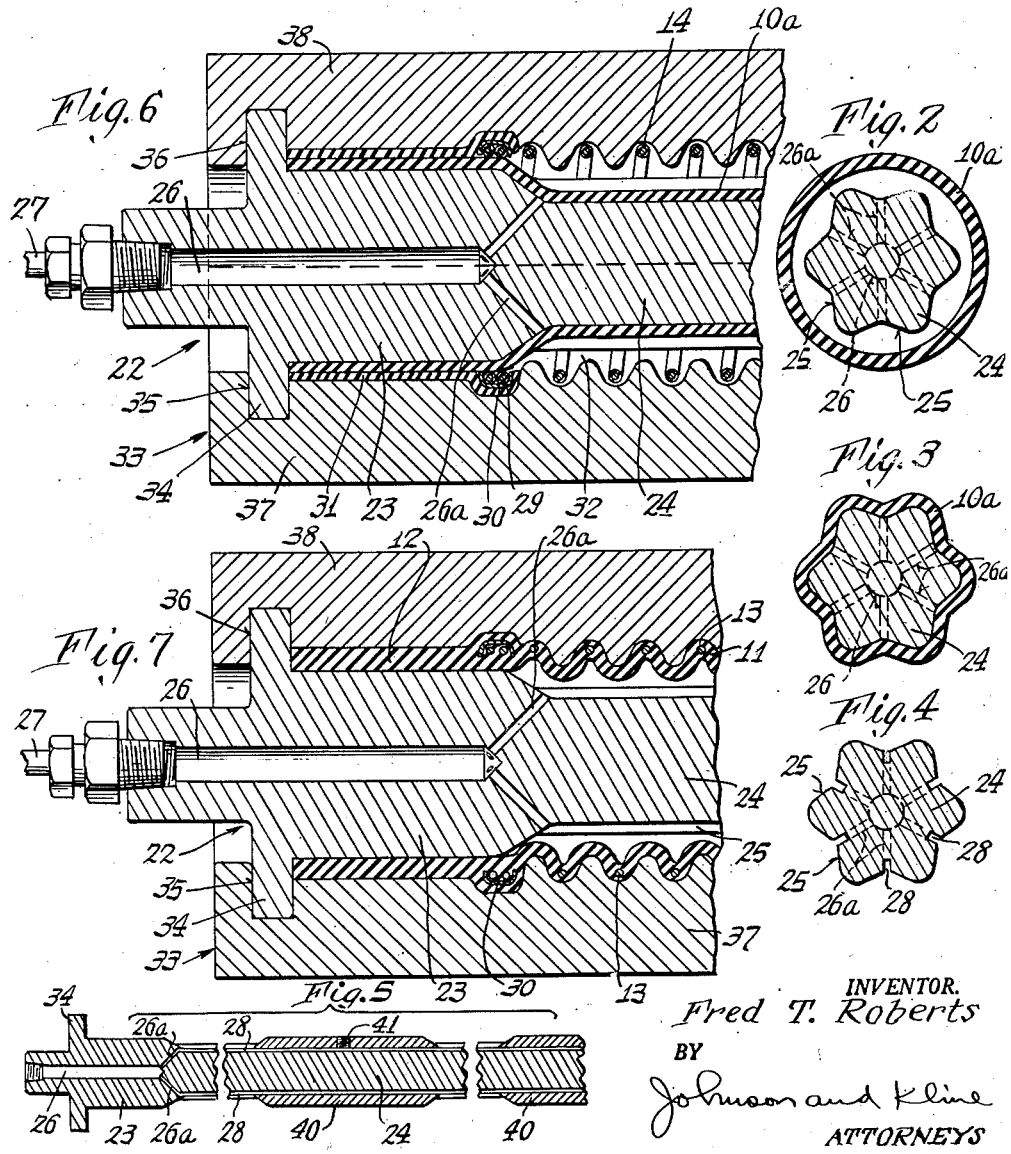
INVENTOR.
Fred T. Roberts
BY
Johnson and Kline
ATTORNEYS

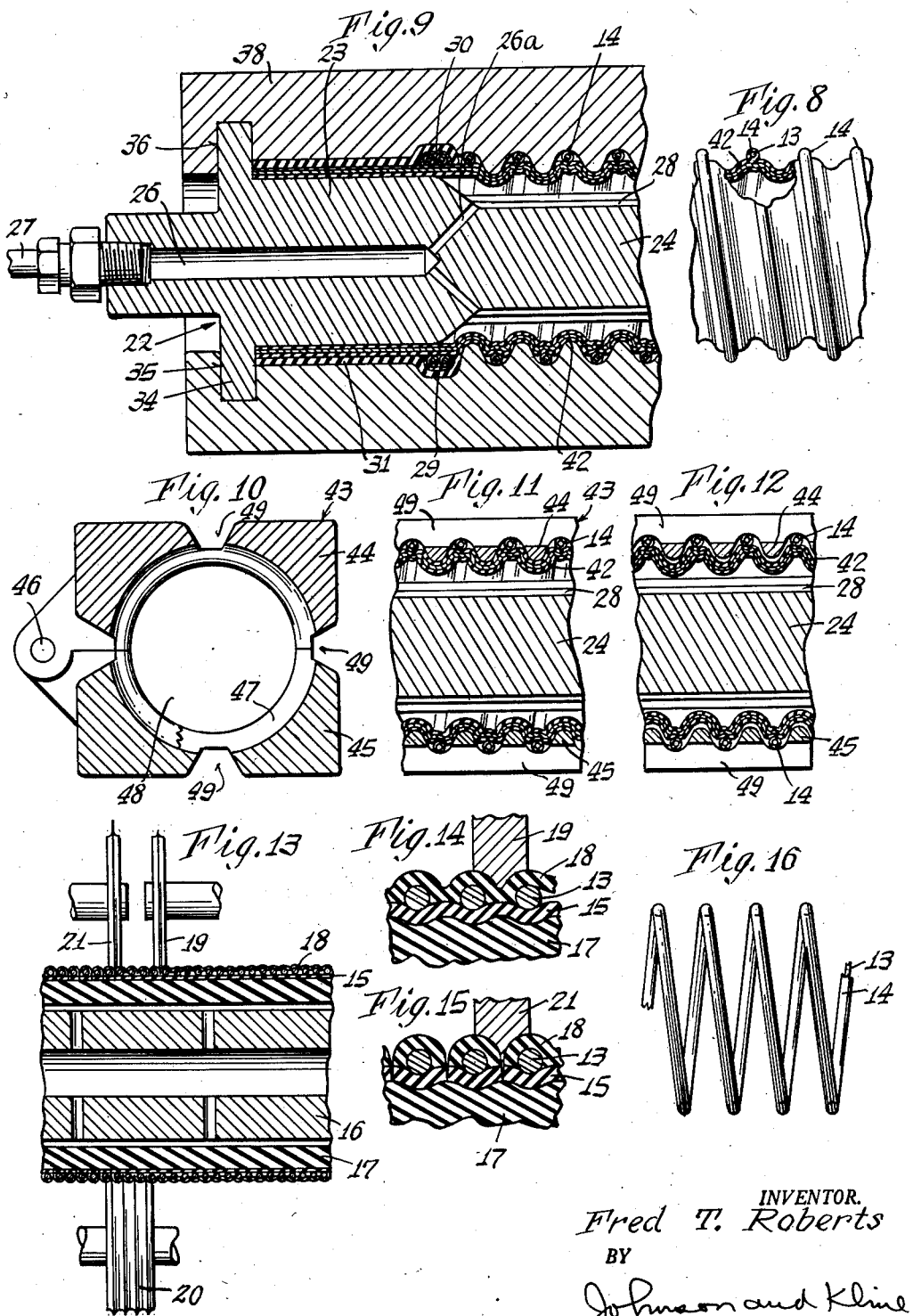

United States Patent Office 2,780,273
Patented Feb. 5, 1957

2,780,273

METHOD AND APPARATUS FOR MAKING A MOLDED FLEXIBLE HOSE

Fred T. Roberts, Wilton, Conn.

Application January 30, 1956, Serial No. 562,216

12 Claims. (Cl. 154—5)

This invention relates to flexible hose and more particularly to a molded flexible hose having a reenforced helically corrugated body, and to the method and apparatus employed in making the same.

Heretofore, it has been the practice to build up the hose body and incorporate therein the helical reenforcement as the body is built and to thereafter cord down the body between the reenforcements to form the helical corrugations. This has the disadvantage that preformed bodies could not be used and also it required the cording down operation which stretched the body over the reenforcing member and down into the troughs of the corrugations.

The present invention overcomes these difficulties by providing a hose formed from a preformed tubular body of elastomeric or laminated fabric material which is molded in the mold cavity by fluid pressure in such a manner that the crest of the corrugations adhere to the wire reenforcement and are substantially unstretched while the troughs are compressed and molded.

In making the hose of the present invention a novel method of covering the reenforcement and a novel method and apparatus for forming the hose are employed which greatly facilitates the production of the hose.

A feature of the invention resides in the use of a novel fluted mandrel for supporting the hose body in a contracted position which facilitates the handling of the body, the insertion thereof into the reenforcement and the assembled body and reenforcement into the mold.

Other features and advantages of the invention will be apparent from the specification and claims when considered in connection with the drawings in which:

Figure 1 shows one form of the invention with the hose partly in section.

Fig. 2 is a sectional view of the mandrel with the body in position thereon prior to being contracted.

Fig. 3 is a view similar to Fig. 2 with the body in contracted engagement with the surface of the fluted portion.

Fig. 4 is a sectional view of another form of fluted mandrel.

Fig. 5 is a fragmentary sectional view of a multiple mandrel for producing a plurality of hose sections.

Fig. 6 is a sectional view of the mandrel, contracted body and reenforcement positioned in the two-part mold.

Fig. 7 is a view similar to Fig. 6 with the hose in molded position.

Fig. 8 is a fragmentary view, partly in section, of the corrugated portion of another form of hose.

Fig. 9 is a view similar to Fig. 7 with the hose of Fig. 8 being molded.

Fig. 10 is a sectional view of the reenforcement spacing attachment.

Fig. 11 shows a fragmentary view of the hose in the spacing attachment and pressed into engagement with the helical spring.

Fig. 12 is a view similar to Fig. 11 showing the body with the pressure released prior to insertion in the mold.

Fig. 13 shows a fragmentary view of the apparatus for covering the helical reenforcement.

Fig. 14 is an enlarged detail showing the rolling together of the layers of covering material on the reenforcement.

Fig. 15 is an enlarged detailed view showing the severing of the material between the convolutions of the helical reenforcement.

Fig. 16 shows the covered reenforcement.

For the purpose of illustrating the present invention a relatively short hose, such as is used as a conduit for a cooling system in an internal combustion engine, will be shown. This hose comprises a body portion 10 which in the form of the invention illustrated in Figs. 1 to 7 is made of molded elastomeric material such as rubber (natural or synthetic) or thermoplastic resins which may be molded under heat and pressure, for example, polyethylene, polyamides, vinyl polymers, copolymers and the like, the particular requirement of the hose determining the composition thereof. The body is helically corrugated at 11 and has at each end a cylindrical attaching portion 12 which is adapted to be readily slipped over the usual metallic connections to the radiator block and the like, not shown, to form a connection therewith.

In carrying out the present invention the corrugations are reenforced by a helical wire reenforcement 13. The reenforcement is secured to the outer surface of the corrugations, preferably the crest thereof, and is preferably covered with a cover 14, as shown in Fig. 16, to provide a smooth outer surface surrounding each of the convolutions, which cover is of a compatible elastomeric material as the body of the hose so that when the hose is molded and set the reenforcement is securely adhered to the hose body and is held in position thereon.

While the reenforcing member or reenforcement may be covered in any way, such as dipping, spraying or the like, in the herein preferred form of the invention, the wires are covered by sheet rubber material which is pressed around each of the wires. This is accomplished, as shown in Figs. 13 to 15, wherein, as shown in Fig. 13, a sheet of rubber 15 is positioned over the expansible mandrel 16 having an inflatable elastic cover 17 of rubber or the like material. The convolutions of wire 13 are spaced on the exterior of the sleeve in a predetermined spaced relation and the mandrel inflated to cause the sheet of rubber to be pressed against the inner surface of the convolutions and hold the wire in said predetermined spaced relation. Thereafter, a layer of rubber 18 is wrapped around the outer surface of the coils. The mandrel is then rotated and a carriage, not shown, carrying a presser wheel or roller 19 engaging the layer on one side of the hose, a back-up wheel or roller 20 engaging the other side of the hose and a slitter 21 adjacent the first presser wheel is fed along the mandrel so that the presser roller presses the outer layer 18 into engagement with the inner layer of rubber 15, as shown in Fig. 14, to cause them to join together and the cutting roller or slitter 21 severs the material between the coils, as shown in Fig. 15, so that a resulting rubber covered, helical reenforcement shown in Fig. 16 is provided.

It is an important feature of the present invention that the body of the hose may be a preformed tubular member 10a. In Figs. 1 to 6 it comprises an extruded or otherwise formed tube of elastomeric material having an outer diameter at least as great as, but preferably slightly larger than the internal diameter of the helical coil reenforcement. The hose body is mounted on a novel mandrel 22 of the present invention which has a cylindrical portion 23 at the ends which is of a diameter to snugly fit within the end of the body and is adapted to form the attaching portion 12 of the hose and the portion 24 of the mandrel intermediate the cylindrical ends is of reduced diameter and is provided with longitudinal flutes 25. One end of the mandrel has a bore 26 to which may be connected a line 27 to supply pressure or produce a vacuum in the bore. The bore is connected to passages 26a leading to each of the flutes. The body normally extends around the fluted portion in spaced relation, as shown in Fig. 2. Suction is applied to the bore and thence through the passage to the fluted portion and interior of the body to suck the body down into engagement with the fluted surface of the mandrel, as shown in Fig. 3. If desired, the fluted portion of the mandrel can have longitudinal grooves or passages 28 at the bottom of the flutes, as shown in Fig. 4, to enhance the holding action in keeping the body in contracted position. The fluted portion provides ample supporting surface for the large body when the latter is contracted and holds the body movement to thereby facilitate its handling.

The mandrel and contracted body thereon are then inserted within the spaced convolutions of the helical reenforcement, the contracted body being securely held in position on the mandrel greatly facilitating this operation, particularly where the outside diameter of the body is slightly larger than the internal diameter of the reenforcement. When in position the end convolutions 29 of the reenforcement are secured to the body by being taped down by tape 30 at a position at the end of the cylindrical portion of the mandrel, as shown in Fig. 6. The attaching portion and tape are then covered by a rubber layer 31 so as to provide the required body for the attaching portion of the hose.

The mandrel with the body and reenforcement thereon are then inserted into the cavity 32 of a heated two-part mold 33 and is located therein by having the flange 34 on the mandrel positioned in cooperating channels 35, 36 in the mold parts 37, 38. The walls of the cavity are provided with a helical groove and the covered helical reenforcement is positioned in the bottom of the groove, as shown in Fig. 6. The suction is removed from the mandrel and fluid pressure is applied to the mandrel and through the passages into the interior of the body which forces the body outwardly into engagement with the reenforcement and the walls of the groove, as shown in Fig. 7, and the heated mold vulcanizes the rubber and adheres the body to the reenforcement. It will be seen that the body which is at least equal to or slightly larger than the internal diameter of the helical coil will be in a substantially unstretched condition in the region of the crest and in a compacted and compressed molded form in the region of the troughs of the corrugations.

Under some circumstances it may be desired to produce a plurality of hose sections in a single operation. This is accomplished by using an elongate mandrel, as shown in Fig. 5, and by having cylindrical collars 40 having a diameter similar to the end sections adjustably mounted thereon and adapted to be spaced so as to form the intermediate attaching portions for the various hoses. The collars can be secured in position by set screw 41. The applying of the hose body and the reenforcements is carried out in the same manner as above-described in connection with the single hose and the longitudinal flutes and/or grooves transmit the suction and pressures to the interior of the hose body to contract and expand the corrugated sections as described. After the hose is molded it is removed from the mandrel and the several hose sections severed at the intermediate attaching portions.

The present invention also lends itself well to the manufacture of hose embodying laminated fabric as the body thereof. Such a body can comprise a plurality of layers of fabric material impregnated with elastomeric material or layers of fabric and elastomeric material. Such a hose is shown in Figs. 8 and 9 wherein the body comprises a plurality of layers 42 of fabric having adhered to the crest of each helical groove the covered reenforcement 13.

The body is mounted on the mandrel, is contracted into engagement with the fluted portion of the mandrel, is inserted into the reenforcement which is secured at the ends by tape and covered with rubber as set forth above. It is inserted into the cavity in the mold and internal fluid pressure is applied within the body to force it into contact with the reenforcement and the walls of the mold as shown in Fig. 9, so that the reenforcement is firmly adhered to the crest of each corrugation formed in the body by the walls of the cavity. It may be desirable in assembling the hose body and the reenforcement to utilize a fixture 43, such as shown in Fig. 10, comprising upper and lower sections 44, 45 hinged at 46 and provided with a helical groove 47 on the inner surface of the bore 48 extending therethrough which is the same as the groove in the mold. Sight openings 49 are provided at spaced intervals on the groove to enable the operator to check the location of the coil. The mandrel is inserted into the helical coil reenforcement and the helical coils are disposed in the fixture so that they lie at the bottom of the grooves, which grooves are similar to those in the mold. The suction is removed and the body returns to its normal position, as shown in Fig. 11, wherein the body returns to its normal diameter so that the portions engage the internal diameter of the reenforcement. If desired, a light pressure can be applied to the interior of the body and cause it to take a preliminary shape with the reenforcement located on the crest of the corrugation prior to its insertion in the mold. This has an advantage in that the fixture is cold and permits the preliminary shaping of the body prior to its insertion into the heated molds. The pressure can be relieved as shown in Fig. 12 and the body may then be positioned in the heated mold and pressure applied as shown in Fig. 9 to mold the body and adhere the reenforcement to the outer surface of the body. Here again, the crest portion of the body is not stretched and the trough portion is compacted and shaped by the fluid pressure to form a strong flexible hose.

Variations and modifications may be made within the scope of the claims and portions of the improvements may be used without others.

I claim:

1. The method of making a reenforced hose comprising the steps of positioning on a mandrel having a longitudinally fluted portion of reduced diameter, a hose body having a diameter at least equal to the internal diameter of a reenforcing member adapted to surround said body, applying suction to the interior of the body overlying the fluted portion of the mandrel and contracting the body into engagement with the fluted surface thereof, inserting the mandrel and contracted body within the reenforcing member, placing the mandrel and reenforcing member in a grooved molding cavity with the reenforcing member disposed in the bottom of the grooves, removing the suction and applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves of the mold cavity.

2. The method of making a reenforced hose comprising the steps of preforming a tubular hose body of moldable material, positioning said body on a mandrel having a longitudinally fluted portion of reduced diameter, said hose body having a diameter at least equal to the internal diameter of the convolutions of a helical reenforcing member adapted to surround said body, contracting the portion of the body overlying the fluted portion into engagement with the fluted surface thereof, positioning the helical, reinforcing member over the mandrel and contracted body and securing the ends thereof to the end portion of the hose body, placing the mandrel and reenforcing member in a molding cavity having helically grooved walls with the reenforcing member disposed in the bottom of the grooves, applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves of the mold cavity.

3. The method of making a reenforced hose comprising positioning on a mandrel having a longitudinally fluted portion of reduced diameter a preformed hose body having a diameter slightly greater than the internal diameter of reenforcing member adapted to surround said body, applying suction to the interior of the body overlying the fluted portion of the mandrel and contracting the body into engagement with the fluted surface thereof, inserting the mandrel and contracted body within the reenforcing member, placing the mandrel and reenforcing member in a grooved molding cavity with the reenforcing member disposed in the bottom of the grooves, removing the suction and applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves of the mold cavity.

4. The method of making a reenforced hose comprising the steps of positioning on a mandrel having a longitudinally fluted portion of reduced diameter a hose body of elastometric material having a diameter at least equal to the internal diameter of an elastomeric covered reenforcing member adapted to surround said body, applying suction to the interior of the body overlying the fluted portion of the mandrel and contracting the body into engagement with the fluted surface thereof, inserting the mandrel and contracted body within the reenforcing member, placing the mandrel and reenforcing member in a grooved molding cavity with the reenforcing member disposed in the bottom of the grooves, removing the suction and applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves to the mold cavity.

5. The method of making a reenforced hose comprising the steps of positioning on a mandrel having a longitudinally fluted portion of reduced diameter a moldable laminated hose body formed from layers of fabric and elastomeric material having a diameter at least equal to the internal diameter of an elastomeric covered reenforcing member adapted to surround said body, applying suction to the interior of the body overlying the fluted portion of the mandrel and contracting the body into engagement with the fluted surface thereof, inserting the mandrel and contracted body within the body reenforcing member, placing the mandrel and reenforcing member in a grooved molding cavity with the reenforcing member disposed in the bottom of the grooves, removing the suction and applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves of the mold cavity.

6. The method of making a reenforced hose comprising positioning on a mandrel having cylindrical end portions and a longitudinally fluted portion of reduced diameter therebetween, a hose body having a diameter at least equal to the internal diameter of the convolutions of a helical reenforcing member adapted to surround said body, applying suction to the mandrel and interior of the hose body and contracting the body into engagement with the fluted surface, spacing the convolutions of the helical reenforcing member and inserting the mandrel and contracted body within the reenforcing member and securing the ends of the extended member to the end portions of the mandrel, placing the mandrel and reenforcing member in a molding cavity having helically grooved outer walls with the reenforcing member disposed in the bottom of the grooves, removing the suction and applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves of the mold cavity.

7. The method of making a reenforced hose comprising the steps of covering a helical spring reenforcing member with an elastomeric material, positioning on a mandrel having a longitudinally fluted portion of reduced diameter a hose body having a diameter at least equal to the internal diameter of the reenforcing member, applying suction to the interior of the body overlying the fluted portion of the mandrel and contracting the body into engagement with the fluted surface thereof, inserting the mandrel and contracted body within the reenforcing member, placing the mandrel and reenforcing member in a grooved molding cavity with the reenforcing member disposed in the bottom of the grooves, removing the suction and applying fluid pressure to the interior of the hose to cause the hose to engage the reenforcing member and the surface of the mold, and applying heat to the mold and causing the body to adhere to the reenforcing member and the body to retain the grooved shape imparted thereto by the grooves of the mold cavity.

8. The invention as defined in claim 10 wherein the wires are covered by placing a sleeve of elastomeric material on an expansible mandrel, positioning a helical spring on the sleeve with the convolutions in predetermined spaced relation, expanding the mandrel to cause the sleeve to hold the wires in position, applying a layer of elastomeric material over the wires on the mandrel, rotating the mandrel, moving a grooved roller along the mandrel, and pressing the layer with a grooved roller to cause the layer to extend around the wires and become integral with the sleeve, and moving a slitting means along the mandrel and slitting the layer between the wires to separate each covered coil.

9. A mandrel adapted to receive a hose body for use in making molded reenforced hose comprising cylindrical end portions adapted to have portions of the hose body secured thereto to form the attaching portions for the hose and the portion of the mandrel extending between said end portions having longitudinally extending flutes to provide an enlarged surface area, one end portion having a bore therein provided with passages extending to each of the longitudinal flutes whereby suction applied to the bore will be transmitted to said longitudinal flutes and cause said hose body to be drawn into engagement with the surface thereof to facilitate handling and insertion of the body into a mold.

10. A mandrel adapted to receive a hose body for use in making molded reenforced hose comprising cylindrical end portions adapted to have portions of the hose body secured thereto to form the attaching portions for the hose and the portion of the mandrel extending between said end portions having longitudinally extending flutes to provide an enlarged surface area, one end portion having a bore therein provided with passages extending to a longitudinal groove in the bottom of each of the longitudinal flutes whereby suction applied to the bore will be transmitted to said longitudinal flutes and cause said hose body to be drawn into engagement with the surface thereof to facilitate handling and insertion of the body into a mold.

11. A mandrel adapted to receive a hose body for use in making a plurality of molded reenforced hose comprising cylindrical end portions adapted to have portions of the hose body secured thereto to form an attaching portion for each end of the hose and the portion of the mandrel extending between said end portions being longitudinally fluted to provide an enlarged surface area, sleeves secured to said mandrel at predetermined points along the fluted portion to form attaching portions for the intermediate hose, one end portion having a bore therein provided with passages extending to each of the longitudinal flutes whereby suction applied to the bore will be transmitted to said longitudinal flutes and cause said hose body between said end portions and said sleeves to be drawn into engagement with the surface thereof to facilitate handling and insertion of the body into a mold.

12. The method of making a helically corrugated, reenforced flexible hose comprising the steps of positioning on a mandrel adapted to be inserted into a mold a hose body of moldable material having a diameter greater than that of the mandrel and at least equal to the internal diameter of a helical spring reenforcing member, the coils of which are covered with elastomeric material and adapted to surround and become permanently attached to said body; applying suction to the interior of the body and contracting the body into engagement with the surface of the mandrel; inserting the mandrel and contracted body within the reenforcing member; attaching the end coils of the reenforcing member to the hose body at a predetermined distance from each end of the hose body; placing the mandrel with the hose body with the reenforcing member attached thereto within a fixture having a helically grooved interior surface to space the coils along the body; releasing the suction and applying fluid pressure to the interior of the hose body to force the hose body firmly against the grooved surface of the fixture and the coils of the reenforcing member to preliminarily corrugate the hose body and firmly attach the reenforcing member to the crests of the corrugations; releasing the fluid pressure within the hose and again applying suction to the interior of the hose; removing the mandrel with the preliminarily formed hose on it and, while the suction is still applied to the interior of the hose, placing the mandrel and hose within a cavity in the mold having grooved walls and then releasing the suction and again admitting fluid pressure to the interior of the hose to force the body into engagement with the grooved walls of the mold; and applying heat to the mold and causing the body to permanently adhere to the reenforcing member and to retain the corrugated shape of the grooved walls imparted thereto by the heat and internal fluid pressure.

References Cited in the file of this patent

UNITED STATES PATENTS

| | | |
|---|---|---|
| 2,396,059 | Roberts | Mar. 5, 1946 |
| 2,508,774 | Roberts | May 23, 1950 |
| 2,560,369 | Roberts | July 10, 1951 |
| 2,584,501 | Roberts | Feb. 5, 1952 |

FOREIGN PATENTS

| | | |
|---|---|---|
| 651,097 | Great Britain | Mar. 11, 1951 |